US007883624B2

(12) United States Patent
Robert et al.

(10) Patent No.: US 7,883,624 B2
(45) Date of Patent: Feb. 8, 2011

(54) SELF-CLEANING FILTER FOR WASHERS

(75) Inventors: Maxime Robert, Quebec (CA); Nathalie Thibault, Quebec (CA)

(73) Assignee: STERIS Inc., Temecula, CA (US)

( * ) Notice: Subject to any disclaimer, the term of this patent is extended or adjusted under 35 U.S.C. 154(b) by 1233 days.

(21) Appl. No.: 11/459,464

(22) Filed: Jul. 24, 2006

(65) Prior Publication Data

US 2008/0017568 A1 Jan. 24, 2008

(51) Int. Cl.
*B01D 35/16* (2006.01)
*B01D 35/02* (2006.01)
*B01D 29/64* (2006.01)
*B01D 29/94* (2006.01)
*B01D 36/04* (2006.01)

(52) U.S. Cl. ........................ 210/304; 210/413; 210/414

(58) Field of Classification Search ................. 210/304, 210/413, 414
See application file for complete search history.

(56) References Cited

U.S. PATENT DOCUMENTS 3,246,760 A * 4/1966 Keel ........................... 210/132
3,389,797 A * 6/1968 Giardini ..................... 210/138
3,448,858 A * 6/1969 Mills et al. .................. 210/354
4,104,164 A 8/1978 Chelton ...................... 210/136
4,113,618 A * 9/1978 Koseki et al. ............... 210/798
4,271,019 A * 6/1981 Galletti ....................... 210/108
4,597,871 A * 7/1986 Okouchi et al. ............. 210/456
5,164,079 A * 11/1992 Klein ......................... 210/186
5,460,845 A 10/1995 Dalmasso et al. ........... 426/320
5,487,283 A 1/1996 Sheppard ....................... 68/27
5,535,667 A 7/1996 Dalmasso et al. ............. 99/472
5,771,840 A 6/1998 Pelletier ..................... 119/452
5,804,072 A * 9/1998 Yang .......................... 210/411
5,964,955 A 10/1999 Rochette et al. ............... 134/10
6,394,033 B1 5/2002 Trogstam et al. ............ 119/458
6,634,507 B1 10/2003 Host-Madsen et al. ...... 209/702
6,916,445 B2 7/2005 Centanni et al. .............. 422/22
2002/0159915 A1 10/2002 Zelina et al. ................... 422/3
2003/0110815 A1 6/2003 Poy .............................. 68/27

* cited by examiner

*Primary Examiner*—Thomas M Lithgow
(74) *Attorney, Agent, or Firm*—Kusner & Jaffe; Michael A. Centanni

(57) ABSTRACT

A self-cleaning filter for a washing apparatus. Water entering a filter assembly travels along a spiral pathway that facilitates the separation of heavy solid debris from the water. A filter element prevents both light and heavy solid debris from entering a conduit leading to spray nozzles, thereby preventing clogging of the nozzles. In a filter cleaning operation, solid debris is removed from the filter assembly.

21 Claims, 8 Drawing Sheets

SELF-CLEANING FILTER FOR WASHERS

FIELD OF THE INVENTION

The present invention relates generally to fluid filtration, and more particularly to a self-cleaning filter for water filtration.

BACKGROUND OF THE INVENTION

Washers are frequently used to clean articles used in the care of laboratory animals, such as animal cages (e.g., wire cages and plastic boxes), racks, debris pans, watering devices, bottles, and feeder bowls. These articles are often heavily soiled with solid debris (including, but not limited to, residues and dirt) from bedding, foodstuffs and animal wastes. One type of washer widely used for cleaning such articles are tunnel washers. Tunnel washers are typically divided into a plurality of processing chambers, wherein pre-washing, washing, rinsing and drying operations are respectively performed. During the pre-washing, washing and rinsing operations various fluids, including, but not limited to, water and water vapor, are introduced and removed from the respective chambers. During drying operations, heated air is circulated through a drying chamber to dry the article.

The process for removing dirt and debris begins in the pre-washing chamber, where spray jets or nozzles are used to spray hot water onto the article. Water sprayed into the pre-washing chamber is collected in a sump, and removed from the tunnel washer through a drain.

In order to conserve water and improve efficiency, it is advantageous to re-use at least some of the water collected in the sump by recirculating the used water back into the pre-washing chamber through the washer nozzles. Since the articles are typically heavily soiled when passing through the pre-washing chamber, the water collected in the sump may contain solid debris large enough to clog the washer nozzles. Therefore, before the water collected by the sump can be re-used the water must pass through a filter to remove solid debris that could cause the washer nozzles to become clogged. In order to maintain effective operation of this filter, periodic filter cleaning is necessary.

Existing filters have numerous drawbacks. In this regard, existing filters require frequent cleaning operations (e.g., backflushing) in order to maintain effective operation of the filter. Other problems with existing filters are the cost and complexity of devices (e.g., motors and/or blades) needed to carry out filter cleaning operations. The present invention addresses these and other drawbacks of existing filters.

SUMMARY OF THE INVENTION

In accordance with the present invention, there is provided a filter assembly comprising: (a) a filter element including: a perforated wall member defining a chamber having an open end and a closed end; and (b) a plunger moveable between a first position and a second position, said plunger including: a scraper element operable to remove solid debris from said chamber, said scraper element fixed at a first end of the plunger extending into said chamber, and a stopper element fixed at a second end of the plunger distal from the first end of the plunger.

In accordance with another aspect of the present invention, there is provided a filter assembly comprising: a filter element including a filter wall having a plurality of perforations formed therein, said filter wall defining an inner region having an open end and a closed end; an outer wall surrounding the filter wall, said outer wall and said filter wall defining a cavity surrounding said inner region; a housing surrounding the outer wall, said housing and said outer wall defining an outer chamber; and a plunger movable between a first position and a second position to remove solid debris from said inner region and said plurality of perforations.

In accordance with still another aspect of the present invention, there is provided a filter assembly comprising: a cylindrical conduit wall; a filter element generally coaxial with the conduit wall, and including a cylindrical filter wall having a plurality of perforations formed therein, said cylindrical filter wall defining a filter chamber having an open end in fluid communication with a return conduit and a closed end; and a housing surrounding said filter wall, wherein said housing and said filter wall define a first annular region of the filter assembly.

An advantage of the present invention is the provision of a filter assembly having a self-cleaning filter element.

Another advantage of the present invention is the provision of a filter assembly having a filter element that prevents clogging of spray nozzles.

Still another advantage of the present invention is the provision of a filter assembly that can effectively and efficiently filter water containing a significant quantity of solid debris.

Still another advantage of the present invention is the provision of a filter assembly that minimizes maintenance requirements for a filter element.

Yet another advantage of the present invention is the provision of a filter assembly that is less expensive to manufacture than existing filter assemblies.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

Figure 1:
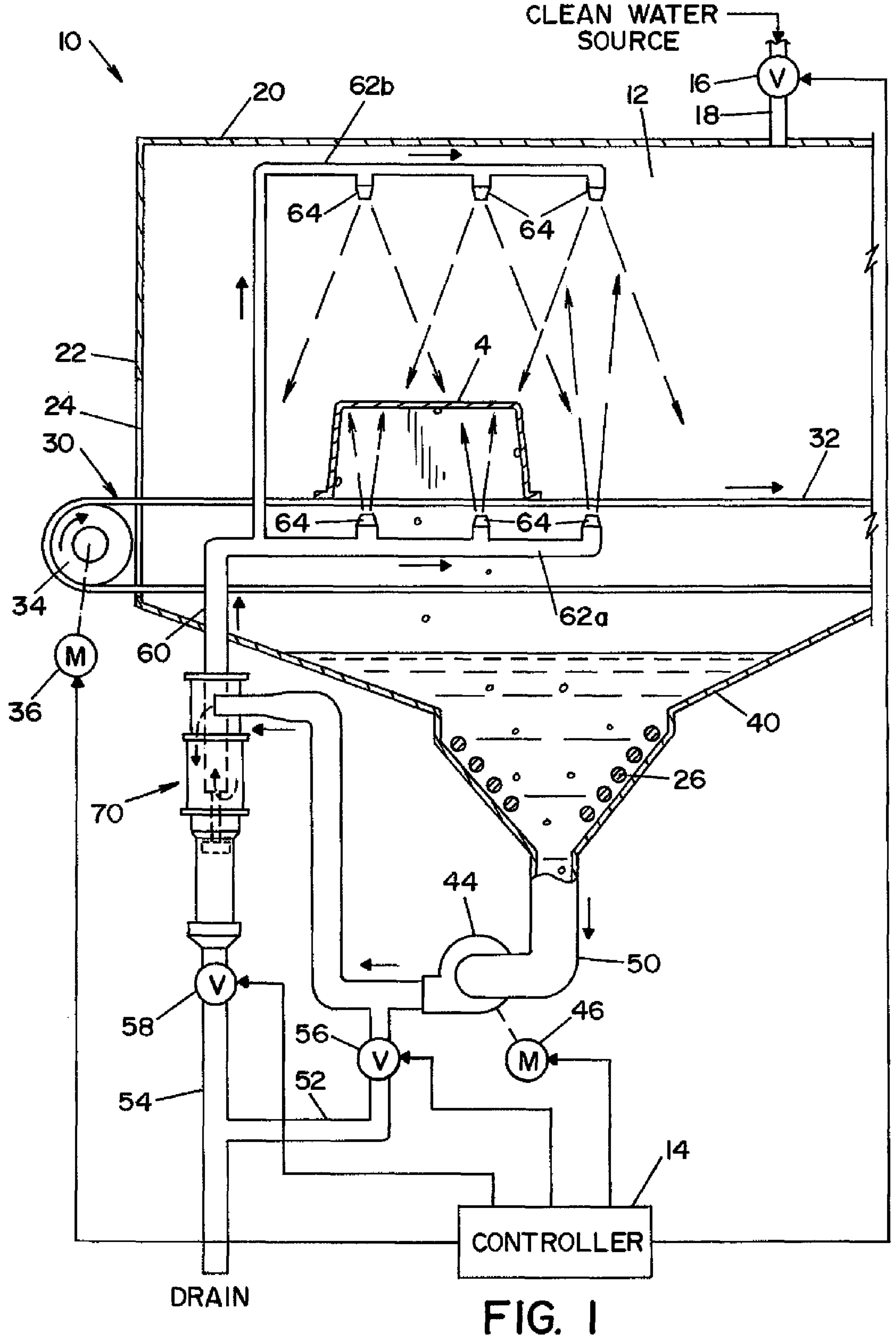
FIG. 1 is a schematic, side elevational view of a pre-washing section of a tunnel washer, including a filter assembly according to a first embodiment of the present invention.

Referring now to the drawings wherein the showings are for the purposes of illustrating a preferred embodiment of the invention only and not for the purposes of limiting same, FIG. 1 shows a schematic, side elevational view of a pre-washing section of a tunnel washer 10. A housing 20 defines an inner chamber that is divided into a plurality of processing chambers, namely, a pre-washing chamber 12, a washing chamber (not shown), a rinsing chamber (not shown) and a drying chamber (not shown). For the purpose of illustrating the present invention, only pre-washing chamber 12 will be shown and described.

A conveyer 30 is located within housing 20 to convey articles 4 through tunnel washer 10. Conveyer 30 is a conventional conveyer device generally comprised of a conveyer belt 32 and rollers 34 that are driven by a motor 36. Conveyer belt 32 extends through the plurality of processing chambers.

In the illustrated embodiment, articles 4 to be processed by tunnel washer 10 are loaded onto conveyer belt 32 at loading end 22 of tunnel washer 10. An opening 24 formed in housing 20 is dimensioned to allow articles 4 to enter pre-washing chamber 12. After processing by tunnel washer 10 is completed, articles 4 are removed from conveyer belt 32 at an unloading end of tunnel washer 10 (not shown).

With reference to pre-washing chamber 12, a sump 40, located below conveyer belt 32, collects liquid from chamber 12. A heating element 26 heats the water collected in sump 40. A recirculation conduit 50 is in fluid communication with sump 40 and a return conduit 60 to recycle liquid collected by sump 40 back into pre-washing chamber 12. Return conduit 60 includes a lower outlet portion 62*a* and an upper outlet portion 62*b*. Lower outlet portion 62*a* is located in a lower region of chamber 12, while upper outlet portion 62*b* is located in an upper region of chamber 12. Lower outlet portion 62*a* and upper outlet portion 62*b* include a plurality of spray jets or nozzles 64 to spray liquid into chamber 12.

A pump 44, powered by motor 46, is provided in recirculation conduit 50 to pump liquid from sump 40 through recirculation conduit 50.

An exit conduit 52 fluidly connects recirculation conduit 50 with a drain conduit 54. Drain conduit 54 is in fluid communication with a drain. A first drain valve 56 is disposed in exit conduit 52. First drain valve 56 is movable between an open position and a closed position, to control the flow of fluid through exit conduit 52 into drain conduit 54.

A filter assembly 70, according to the present invention, is disposed between recirculation conduit 50 and return conduit 60. Filter assembly 70 is in fluid communication with recirculation conduit 50, return conduit 60 and drain conduit 54, Filter assembly 70 provides filtration of the water before it is returned to pre-washing chamber 12, as will be described in detail below. A second drain valve 58 is disposed between filter assembly 70 and drain conduit 54. Second drain valve 58 is moveable between an open position and a closed position to control fluid flow from filter assembly 70 into drain conduit 54.

A clean water conduit 18 is in fluid communication with pre-washing chamber 12 to supply clean water to chamber 12 from a source of clean water. A water inlet valve 16 is disposed within clean water conduit 18 to control the flow of clean water into pre-washing chamber 12.

A controller 14 provides control signals for operation of conveyer motor 36, pump motor 46, first drain valve 56, second drain valve 58, and inlet valve 16. Controller 14 preferably takes the form of a programmable microcontroller or microcomputer.

Figure 2:
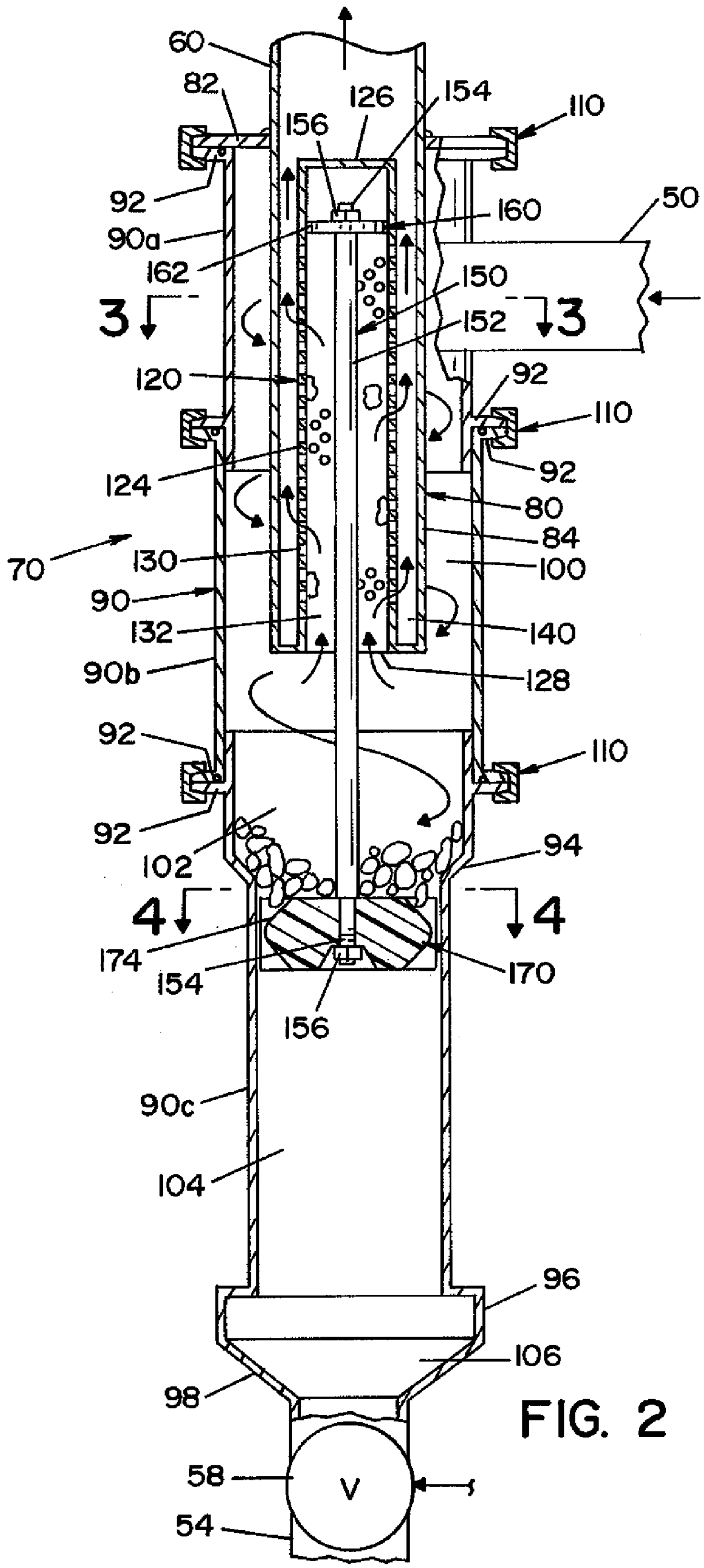
FIG. 2 is a cross-sectional view of the filter assembly of FIG. 1, during a filtration operation.

In accordance with the illustrated embodiment shown in FIG. 2, filter assembly 70 is generally comprised a tubular housing 90, a lower section 80 of return conduit 60, a filter element 120, and a piston or plunger 150.

Figure 3:
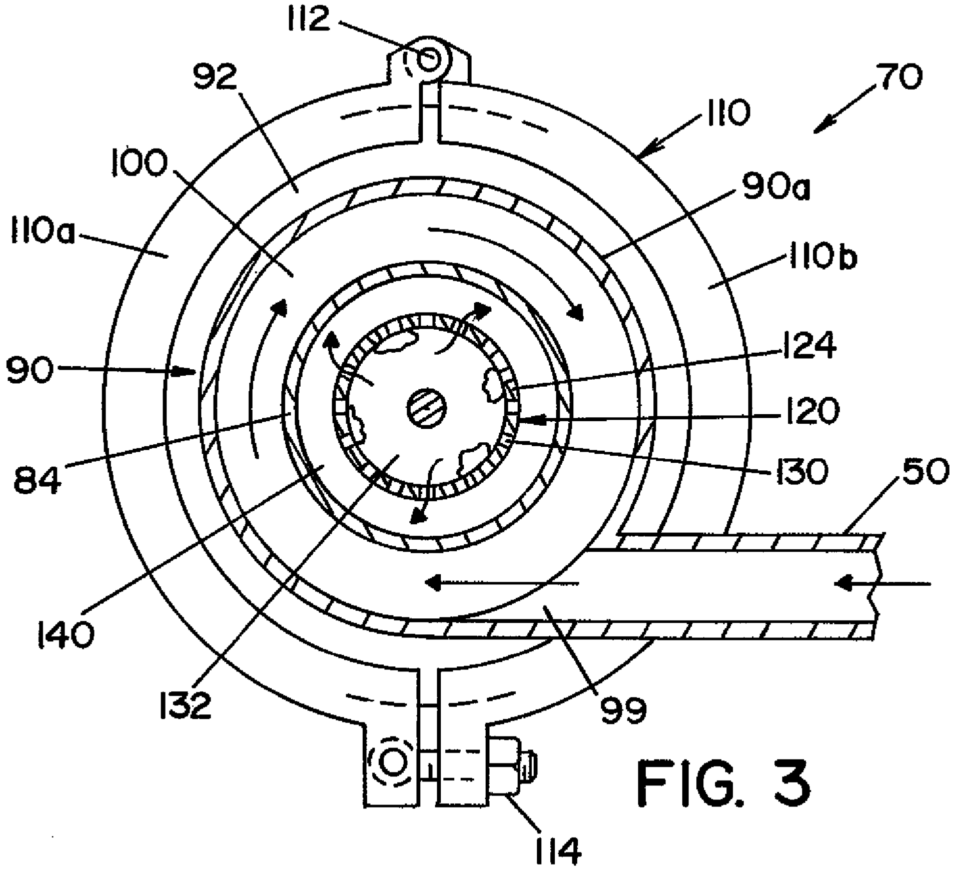
FIG. 3 is a cross-sectional view of the filter assembly taken, along lines 3-3 of FIG. 2.

Housing 90 is comprised of a plurality of tubular housing sections 90*a*, 90*b* and 90*c*. Housing section 90*a* includes a side entry port 99 located at the upper end thereof, as best seen in FIG. 3. Side entry port 99 is in fluid communication with recirculation conduit 50. Housing section 90*b* includes a funnel portion 94 to direct the flow of solid debris and water toward the center of housing 90. Housing section 90*c* includes an enlarged portion 96 and a funnel portion 98. Annular flanges 92 are formed at the upper and lower ends of housing section 90*a* and housing section 90*b*. Annular flanges 92 are also formed at upper end of housing section 90*c*. In addition, an annular flange 82 surrounds the outer surface of lower section 80 of return conduit 60.

Conventional split ring clamps 110 are used to sequentially join lower section 80 of return conduit 60, and housing sections 90*a*, 90*b* and 90*c*. As best seen in FIG. 3, split ring clamps 110 are comprised of first and second semi-circular sections 110*a*, 110*b*. First and second semi-circular sections 110*a*, 110*b* are pivotally connected to each other by pivot means 112 at a first end of sections 110*a*, 110*b*. First and second semi-circular sections 110*a*, 110*b* are connected to each other by fastening means 114 at a second end of sections 110*a*, 110*b*.

A first split ring clamp 110 joins annular flange 82 of lower section 80 to annular flange 92 at upper end of housing section 90*a*. A second split ring clamp 110 joins annular flange 92 at lower end of housing section 90*a* to annular flange 92 at upper end of housing section 90*b*. A third split ring clamp 110 joins annular flange 92 at lower end of housing section 90*b* to annular flange 92 at upper end of housing section 90*c*.

Housing 90 defines a plurality of regions of filter assembly 70, including an upper region 102, a lower region 104 and a bypass region 106. Housing 90 and lower section 80 of return conduit 60 are spaced to define an outer annular region or chamber 100.

In the illustrated embodiment, filter element 120 is formed as a portion of lower section 80 of return conduit 60. Filter element 120 is basically comprised of a cylindrical inner wall 124 formed inside cylindrical wall 84 of lower section 80. Cylindrical inner wall 124 and wall 84 are spaced to define an annular region or cavity 140 inside lower section 80 of return conduit 60. Cylindrical inner wall 124 also defines an inner region or chamber 132 inside lower section 80 of return conduit 60. Inner chamber 132 has a closed end 126 and an open end 128. Open end 128 of inner chamber 132 is in fluid communication with upper region 102 of filter assembly 70. Perforations are formed in inner wall 124 to allow fluid to pass between inner chamber 132 and annular cavity 140.

Plunger 150 is basically comprised of a rod 152, a scraper element 160 and a stopper element 170. Threaded sections 154 extend from upper and lower ends of rod 152.

In the illustrated embodiment, scraper element 160 is disk shaped having an annular outer edge surface 162. The diameter of scraper element 160 is substantially the same as the inner diameter of inner chamber 132, but allowing a small clearance therebetween to allow scraper element 160 to be moveable within inner chamber 132, as will be described below. Scraper element 160 also includes a hole formed generally in the center thereof to mount scraper element 160 onto threaded section 154 at the upper end of rod 152. A nut 156 secures scraper element 160 to the upper end of rod 152.

Figure 4:
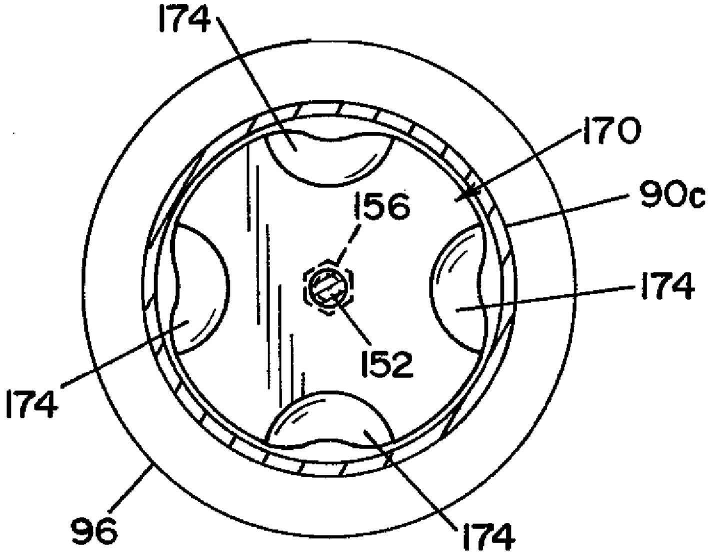
FIG. 4 is a cross-sectional view of the filter assembly, taken along lines 4-4 of FIG. 2.

According to the illustrated embodiment, stopper element 170 generally takes the form of a disk having a plurality of recesses or notches 174 formed therein, as best seen in FIG. 4. The diameter of stopper element 170 is substantially the same as the inner diameter of housing section 90*c* defining lower region 104, but allowing a small clearance therebetween to allow stopper element 170 to be moveable within lower region 104, as will be described below. Stopper element 170 also includes a hole formed generally in the center thereof to mount stopper element 170 onto threaded section 154 at the lower end of rod 152. A nut 156 secures stopper element 170 to the lower end of rod 152.

Figure 5:
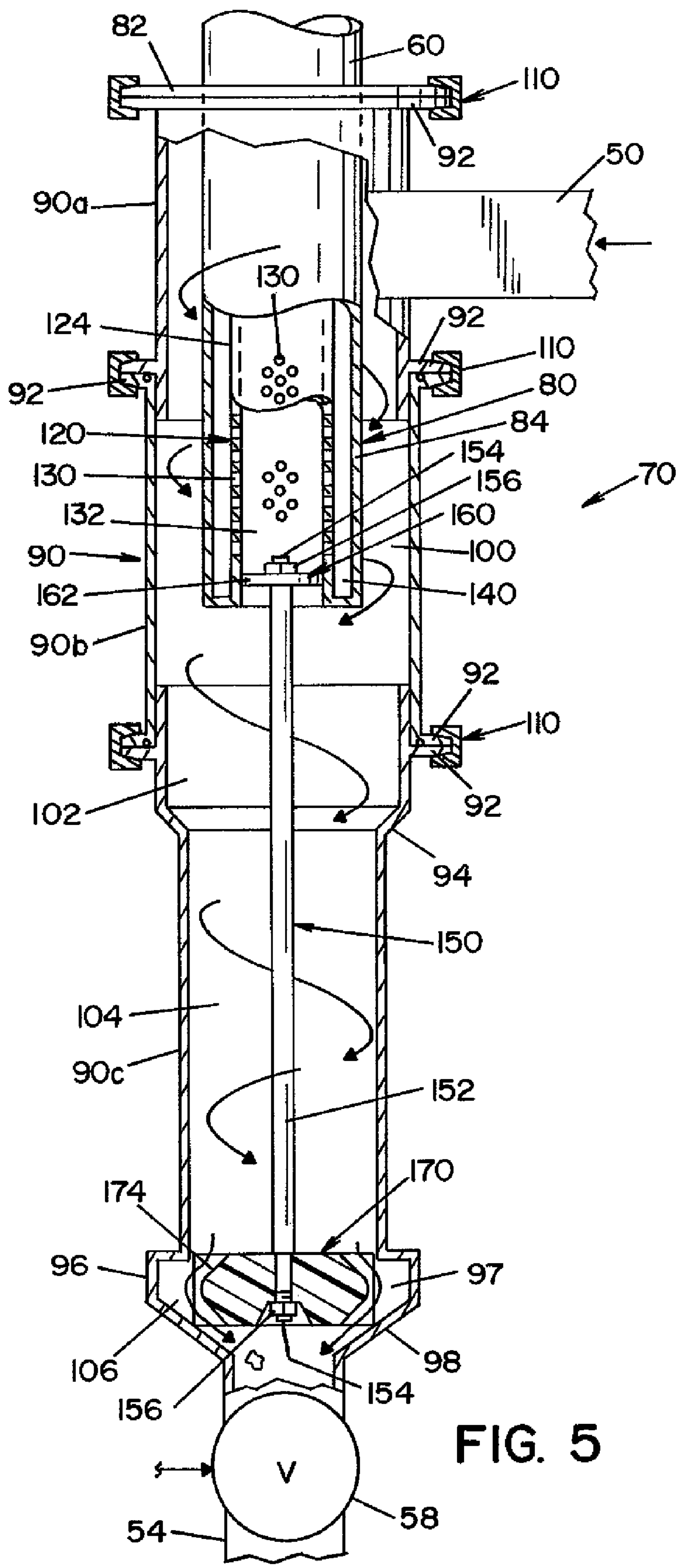
FIG. 5 is a cross-sectional view of the filter assembly shown in FIG. 2 during a filter cleaning operation.

Plunger 150 is moveable between an upper position (FIG. 2) and a lower position (FIG. 5). As plunger 150 moves between the upper and lower positions, scraper element 160 moves through inner chamber 132 to remove any solid debris blocking or lodged within perforations 130, as will be described in detail below.

When plunger 150 is in the upper position (FIG. 2), scraper element 160 is located at the upper end of inner chamber 132, and stopper element 170 is located at the upper end of lower region 104. When stopper element 170 is located in lower region 104, stopper element 170 traps most solid debris, thus preventing solid debris from moving downward past stopper element 170. At the same time, stopper element 170 allows water to flow downward past stopper element 170. In this regard, water flows through the openings formed by notches 174 of stopper element 170. As indicated above, funnel portion 94 of housing section 90*c* directs the flow of water and solid debris toward the center of housing 90.

When plunger 150 is in the lower position (FIG. 5), scraper element 160 is located at the lower end of inner chamber 132, and stopper element 170 is located in bypass region 106. Both water and solid debris can flow past stopper element 170 when stopper element 170 is located in bypass region 106. In this regard, the diameter of enlarged portion 96 of housing section 90*c* is larger than the diameter of stopper element 170, thereby providing an annular gap 97 dimensioned to allow both water and solid debris to travel downward past stopper element 170. Funnel portion 98 of housing section 90*c* directs the flow of both water and solid debris toward the center of housing 90.

For the purpose of describing an embodiment of the present invention, sump 40, pump 44, recirculation conduit 50, filter assembly 70 and return conduit 60 are collectively referred to herein as a "circulation system" for circulating fluid (i.e., water) through pre-washing chamber 12.

Operation of filter assembly 70 will now be described in detail with particular reference to FIGS. 2-5. As indicated above, articles 4 are ordinarily heavily soiled when passing through pre-washing chamber 12. Accordingly, the dirty water collected in sump 40 will usually contain a significant amount of solid debris. Therefore, before the water can be recycled back into prewashing chamber 12, the water collected by sump 40 must first be subject to filtration to remove solid debris that could clog nozzles 64, as will be described in detail below.

Before water is initially circulated through filter assembly 70, plunger 150 will be located at the lower position shown in FIG. 5, due to gravity. To "prime" the circulation system with a volume of water sufficient to effectively pre-wash articles 4, controller 14 transmits a control signal to move inlet valve 16 from a closed position to an open position. Consequently, clean water from the clean water source enters pre-washing chamber 12 through clean water conduit 18. The clean water entering pre-washing chamber 12 collects in sump 40. Controller 14 also transmits control signals to move both drain valves 56 and 58 to the closed position and activates motor 46 of pump 44. As a result, water collected in sump 40 is pumped through recirculation conduit 50 to filter element 120. Since valve 58 is in a closed position, water will initially fill bypass chamber 106 below stopper element 170. As the space below stopper element 170 fills with water, pressure will increase below stopper element 170, and cause plunger 150 to rise upward to the upper position (FIG. 2). As water continues to accumulate in filter assembly 70, lower region 104 and upper region 102 fill with water. The water level inside filter assembly 70 continues rising as additional water fills sump 40 and is pumped into filter assembly 70. Eventually, the water inside filter assembly 70 reaches a level wherein water fills inner chamber 132 and passes through perforations 130 to annular cavity 140. Water entering annular cavity 140 travels through return conduit 60 to lower and upper outlet portions 62*a*, 62*b* (FIG. 1). Water pressure inside return conduit 60 forces water out through nozzles 64, thereby spraying water into pre-washing chamber 12. The water sprayed into pre-washing chamber 12 is collected in sump 40 and again recirculated back into pre-washing chamber 12 by circulating through recirculation conduit 50, filter assembly 70, and return conduit 60.

After the circulation system has been primed with a sufficient volume of water from the clean water source, controller 14 transmits a control signal to move inlet valve 16 from the open position to the closed position. It should be appreciated that a float level (not shown) may be used to ascertain whether the volume of water in the circulation system has reached a sufficient volume for effective pre-washing.

After the circulation system has been primed with water, tunnel washer 10 can be operated to pre-wash articles 4 traveling through pre-washing chamber 12. To commence a pre-washing operation, motor 36 is activated by controller 14, thereby causing rollers 34 to drive conveyer belt 32. As a result, articles 4 loaded onto conveyer belt 32 will travel through pre-washing chamber 12 as water is sprayed from nozzles 64. Dirty water is collected in sump 40 and is pumped by pump 44 through recirculation conduit 50 into filter assembly 70. Filter assembly 70 functions to remove solid debris from the dirty water before recycling the water back into pre-washing chamber 12 through return conduit 60. Therefore, filter assembly 70 prevents solid debris from clogging nozzles 64.

Water from recirculation conduit 50 enters annular region 100 through side entry port 99 formed in the side of housing section 90*a*, as best seen in FIG. 3. The side entry into the upper end of annular region 100 causes the water to initiate a rotational flow, whereby the water spirals around outer wall 84 of lower section 80 in a downward direction (see FIG. 2). As the water continues the downward spiral the water moves into upper region 102. Heavier solid debris, falls to the lower end of upper region 102. Stopper element 170 prevents the solid debris from falling into lower region 104, as shown in FIG. 2.

Lower pressure in return conduit 60 cause the water to flow into inner chamber 132. The water carries lighter solid debris into inner chamber 132. As the water continues to flow in the direction of lower pressure in return conduit 60, the water passes through perforations 130 of filter element 120 as it travels into annular cavity 140. Perforations 130 are dimensioned to block the passage of solid debris that is large enough to clog nozzles 64. Water entering annular cavity 140 continues traveling through return conduit 60 to lower and upper outlet portions 62*a*, 62*b*. Accordingly, the recycled water is released into pre-washing chamber 12 through nozzles 64.

Most of the lighter solid debris that is blocked by filter element 120 will eventually settle downward into lower end of upper region 102. Stopper element 170 traps most of the lighter solid debris, thus preventing the lighter solid debris from moving downward past stopper element 170.

Some solid debris may block or become lodged in perforations 130 of filter element 120, or become trapped (e.g., float) within inner chamber 132. The flow of water through perforations 130 will decrease as more solid debris blocks or becomes lodged in perforations 130 and/or becomes trapped within inner chamber 132. Consequently, it becomes necessary to periodically perform a filter cleaning operation to remove solid debris from perforations 130 and inner chamber 132, and thus maintain filter efficiency and adequate water flow through filter element 120.

A filter cleaning operation may be initiated in response to a water pressure or a water flow rate that is below a predetermined level. In this regard, a pressure sensor (not shown) or a flow sensor (not shown) may provide data signals to controller 14 indicative of pressure or flow rate at a location along the circulation system (e.g., at return conduit 60 or pump 44). If controller 14 determines that the pressure or flow rate is below a predetermined level, a filter cleaning operation may be initiated. Alternatively, a filter cleaning operation may be initiated by controller 14 after a predetermined period of time has elapsed, or in response to a signal manually generated by an operator.

When a filter cleaning operation is initiated, conveyer motor 36 may be deactivated by controller 14, thereby causing conveyer belt 32 to stop moving. Furthermore, controller 14 transmits control signals to move valve 58 from a closed position to an open position. Water located below stopper element 170 in lower region 104 and bypass region 106 will immediately flow into the drain through drain conduit 54. Controller 14 may also transmits a control signal to move valve 56 from a closed position to an open position. Accordingly, exit conduit 52 is used to provide an additional pathway for water in recirculation conduit 50 to flow into drain conduit 54.

If pump 44 remains activated during the filter cleaning operation, then the water pressure inside filter assembly 70 will cause plunger 150 to move from the upper position (FIG. 2) to the lower position (FIG. 5). If controller 14 transmits a control signal to deactivate pump 44 during the filter cleaning operation, then the weight of the water inside filter assembly 70 will cause plunger 150 to move from the upper position (FIG. 2) to the lower position (FIG. 5).

As scraper element 160 moves downward through inner chamber 132, scraper element 160 will remove from inner chamber 132 solid debris blocking or lodged in perforations 130, as well as any solid debris that has become trapped in inner chamber 132.

Stopper element 170 moves downward, and eventually comes to rest in bypass region 106 (FIG. 5). As indicated above, when stopper element 170 is located in bypass region 106 both water and solid debris can flow around stopper element 170 through annular gap 97. Therefore, solid debris will flow into the drain through drain conduit 54. Valve 58 remains in the open position to allow some or all of the water in the circulation system to flow into the drain.

After the filter cleaning operation is completed, controller 14 transmits a control signal to move valves 56 and 58 to the closed position. Inlet valve 16 is moved from the closed position to the open position by controller 14, in order to replace some or all of the drained water with clean water from the clean water source. If motor 46 has been deactivated, controller 14 also transmits a control signal to activate motor 46 of pump 44. As a result, water collected in sump 40 is pumped through recirculation conduit 50, and fills filter assembly 70 in a manner similar to the water priming operation described above. As filter assembly 70 fills with water, increased water pressure causes plunger 150 to rise upward to the upper position (FIG. 2). As water fills inner chamber 132, the water will pass through perforations 130 to annular cavity 140. Water entering annular cavity 140 travels through return conduit 60 to lower and upper outlet portions 62*a*, 62*b* (FIG. 1). Water pressure inside return conduit 60 forces water out through nozzles 64, thereby spraying water into pre-washing chamber 12. This water is again collected in sump 40 and recirculated through the circulation system.

Once the water circulating in the circulation system has been replenished to a volume sufficient for a pre-washing operation, controller 14 transmits a control signal to close inlet valve 16, thereby preventing additional clean water from entering pre-washing chamber 12 from the clean water source. The water circulating in the circulation system is then used in a pre-washing operation, as discussed in detail above.

Figure 6:
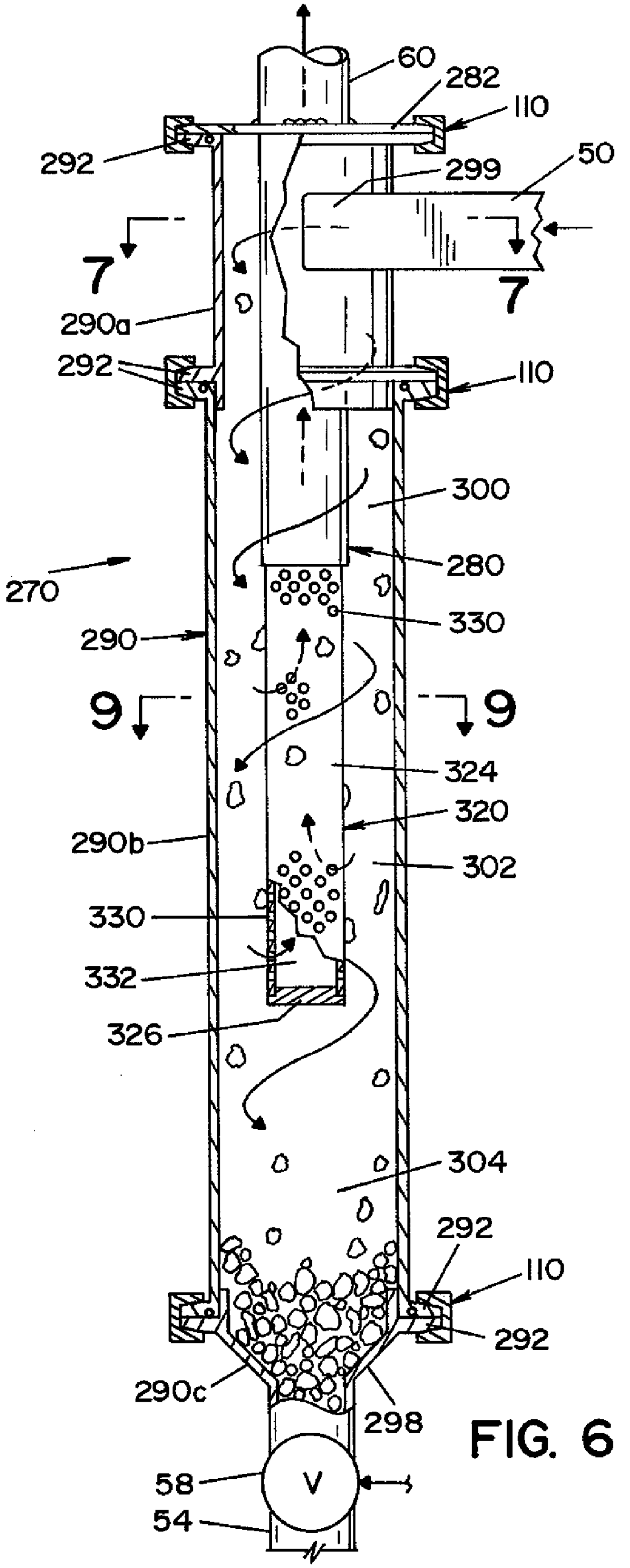
FIG. 6 is a cross-sectional view of a filter assembly according to a second embodiment of the present invention.

A second embodiment of the filter assembly will now be described with reference to FIGS. 6-10. Referring now to FIG. 6, there is shown a cross-sectional view of a filter assembly 270, according to the second embodiment of the present invention. Similar to filter assembly 70, filter assembly 270 is disposed between recirculation conduit 50 and return conduit 60. Accordingly, filter assembly 270 is in fluid communication with recirculation conduit 50, return conduit 60 and drain conduit 54.

Figure 7:
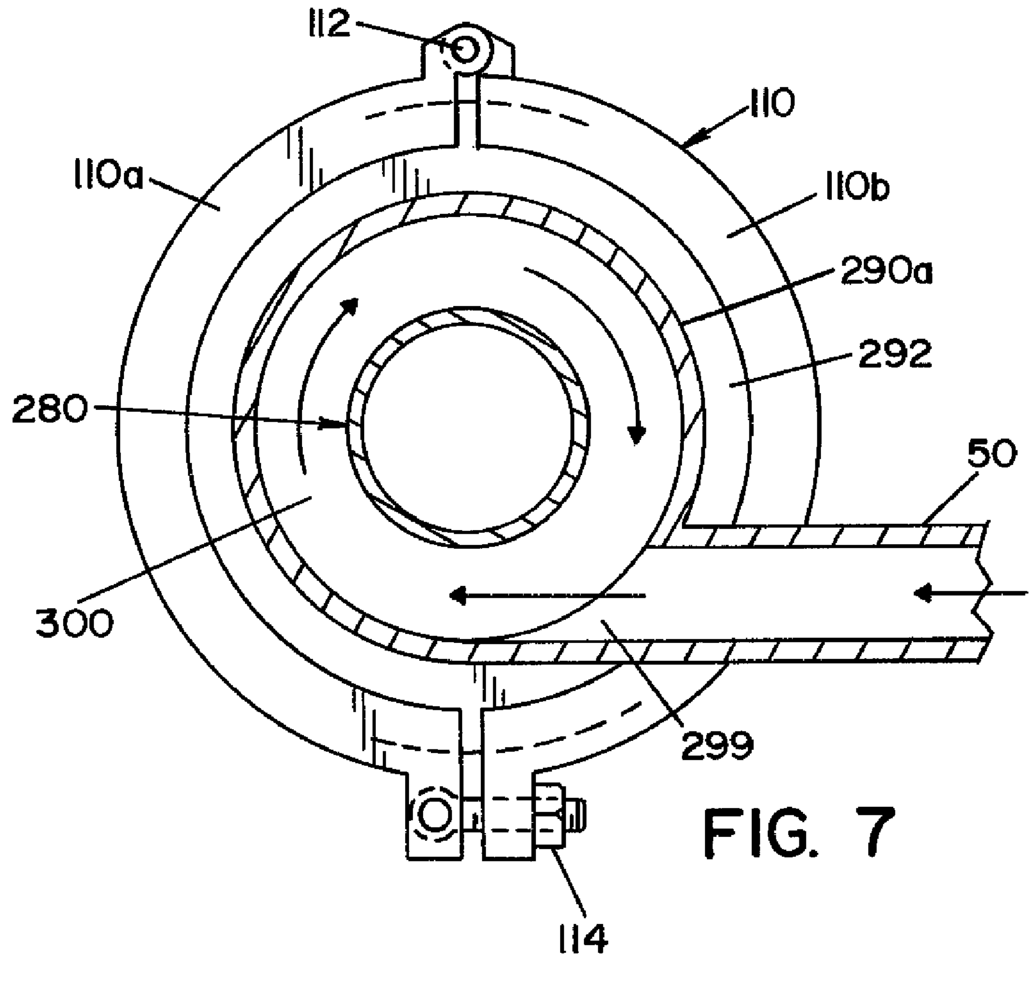
FIG. 7 is a cross-sectional view of the filter assembly, taken along lines 7-7 of FIG. 6.

Filter assembly 270 is generally comprised a tubular housing 290, a lower section 280 of return conduit 60, and a filter element 320. In the illustrated embodiment, housing 290 is comprised of a plurality of housing sections 290*a*, 290*b* and 290*c*. Housing section 290*a* includes a side entry port 299 located at the upper end thereof, as best seen in FIG. 7. Side entry port 299 is in fluid communication with recirculation conduit 50. Housing section 290*c* includes a funnel portion 298 to direct flow toward the center of housing 90. Annular flanges 292 are formed at the upper and lower ends of housing section 290*a* and housing section 290*b*, and are formed at upper end of housing section 290*c*. An annular flange 282 also surrounds the outer surface of lower section 280 of return conduit 60.

Conventional split ring clamps 110 are used to sequentially join lower section 280 of return conduit 60, and housing sections 290*a*, 290*b* and 290*c*. A first split ring clamp 110 joins annular flange 282 of lower section 280 to annular flange 292 at upper end of housing section 290*a*. A second split ring clamp 110 joins annular flange 292 at lower end of housing section 290*a* to annular flange 292 at upper end of housing section 290*b*. A third split ring clamp 110 joins annular flange 292 at lower end of housing section 290*b* to annular flange 292 at upper end of housing section 290*c*.

Housing 290 and lower section 280 of return conduit 60 define an upper annular region 300, while housing 290 and filter element 320 define an adjacent lower annular region 302. Housing 290 also defines a collecting region 304, wherein filtered solid debris is collected.

Figure 8:
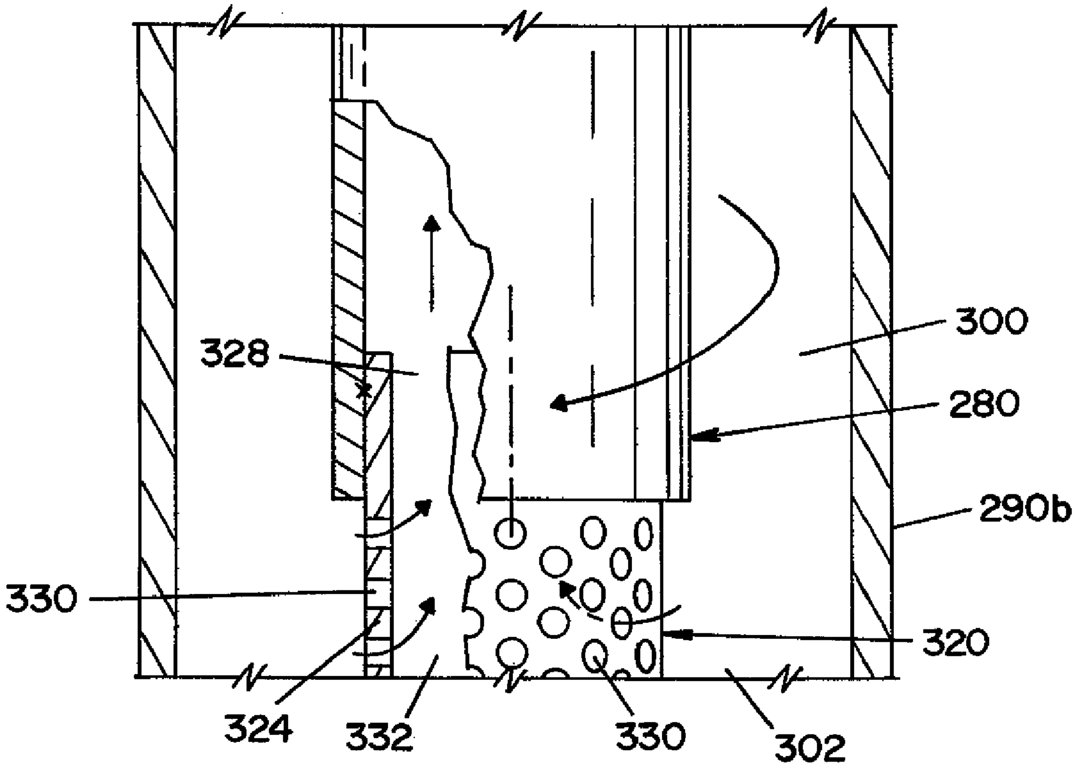
FIG. 8 is an enlarged cross-section view of a portion of the filter assembly shown in FIG. 6, wherein a filter element is joined to a return conduit.
Figure 10:
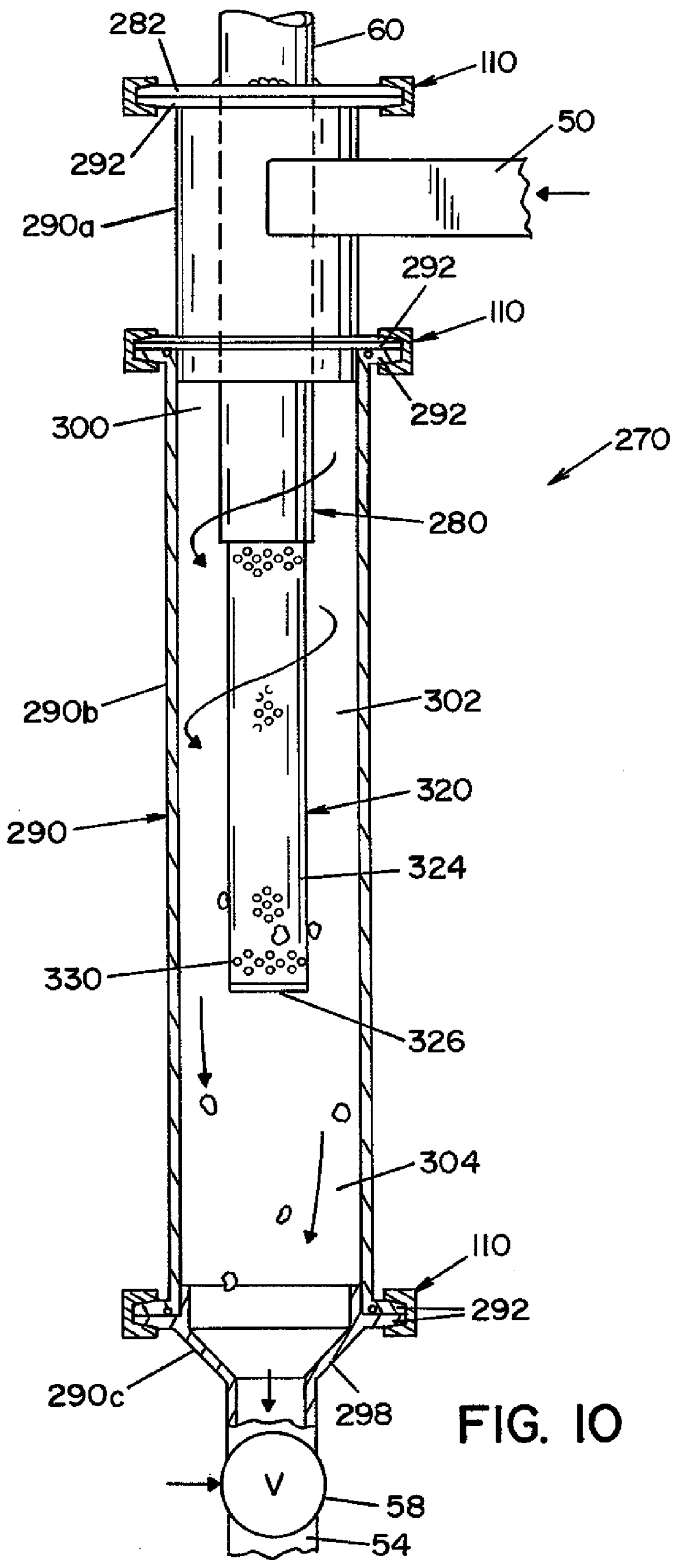
FIG. 10 is a cross-sectional view of a filter assembly according to the second embodiment of the present invention.

In the illustrated embodiment, filter element 320 includes a generally cylindrical wall 324 that extends downward from lower section 280 of return conduit 60, as best seen in FIGS. 6, 8 and 10. Cylindrical wall 324 is generally coaxial with lower section 280 of return conduit 60. The outer surface of cylindrical wall 324 is fixed to the inner surface of lower section 280 of return conduit 60 (e.g., by spot welding). Cylindrical wall 324 of filter element 320 defines a cylindrical chamber 332 having a closed end 326 and an open end 328. Open end 328 of cylindrical chamber 332 is in fluid communication with lower section 280 of return conduit 60. Perforations 330 are formed in cylindrical wall 324 to allow fluid to pass between lower annular region 302 and cylindrical chamber 332.

Operation of filter assembly 270 will now be described in detail. Controller 14 transmits a control signal to move drain valve 58 to a closed position. Thereafter, the system can be primed with clean water in the same manner as described above in connection with the first embodiment of the present invention.

Water from conduit 50 enters upper annular region 300 through side entry port 299 formed in the side of housing section 90*a*, as best seen in FIG. 7. The side entry into the upper annular region 300 causes the water to initiate a rotational flow, whereby the water flows along a downward spiral path inside filter assembly 270, as best seen in FIG. 6.

As the water continues along the downward spiral path, the water moves into lower annular region 302. Heavier solid debris, falls into collecting region 304, and collects at the bottom thereof. Drain valve 58 prevents solid debris from passing into drain conduit.

Figure 9:
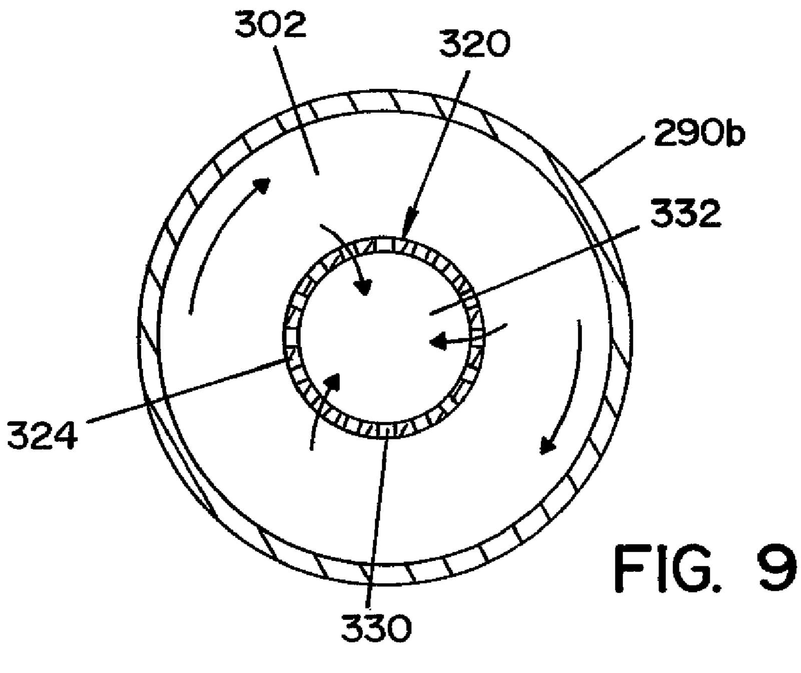
FIG. 9 is a cross-sectional view of the filter assembly, taken along lines 9-9 of FIG. 6.

As the water continues to flow in the direction of lower pressure in return conduit 60, the water passes through perforations 330 of filter element 320 as it travels into cylindrical chamber 332 (see FIGS. 8 and 9). Perforations 330 are dimensioned to block the passage of solid debris that is large enough to clog nozzles 64. Water entering cylindrical chamber 332 continues traveling through return conduit 60 to lower and upper outlet portions 62*a*, 62*b*. Accordingly, the recirculated water is released into pre-washing chamber 12 through nozzles 64. Most of the lighter solid debris that is blocked by filter element 320 will eventually settle downward into collecting region 304.

It is believed that the spiraling flow of the water within upper annular region 300 and lower annular region 302 will draw solid debris away from perforations 330, thereby preventing solid debris from blocking or becoming lodged in perforations 330.

Solid debris that collects in collecting region 304 of filter assembly 270 is periodically removed therefrom in a filter cleaning operation. In this regard, controller 14 transmits a control signal to move drain valve 58 to an open position. Accordingly, solid debris and water flow through drain conduit 54 into the drain (see FIG. 10). Clean water may be pumped through filter assembly 270 while drain valve 58 remains open in order to flush out any additional solid debris remaining in filter assembly 270. After the filter cleaning operation is completed, controller 14 transmits a control signal to move drain valve from an open position to a closed position. Some or all of the water removed from filter assembly 270 can then be replenished from the clean water source, such that there is a sufficient volume of water circulating in the circulation system for a pre-washing operation.

Other modifications and alterations will occur to others upon their reading and understanding of the specification. It is intended that all such modifications and alterations be included insofar as they come within the scope of the invention as claimed or the equivalents thereof.

Having described the invention, the following is claimed:

1. A filter assembly comprising:

a filter element including:

a perforated wall member defining a chamber having an open end and a closed end; and a plunger moveable between a first position and a second position, said plunger including:

a scraper element operable to remove solid debris from said chamber, said scraper element fixed at a first end of the plunger extending into said chamber, and a stopper element operable to impede flow of solid debris out of said filter assembly, said stopper element fixed at a second end of the plunger distal from the first end of the plunger.

2. A filter assembly according to claim 1, wherein said scraper element moves within said chamber to remove solid debris therefrom, as said plunger moves between the first position and the second position.

3. A filter assembly according to claim 1, wherein said stopper element moves between a stopper position and a bypass position as said plunger moves between the first position and the second position, wherein the flow of solid debris past the stopper element is impeded in the stopper position and the flow of solid debris past the stopper element is not impeded in the bypass position.

4. A filter assembly according to claim 1, wherein said filter assembly further comprises:

a conduit wall, wherein said wall member and said conduit wall define a first cavity surrounding said chamber.

5. A filter assembly according to claim 4, wherein said first cavity is in fluid communication with a return conduit to a pre-washing chamber.

6. A filter assembly according to claim 4, wherein said filter assembly further comprises:

a housing, wherein said housing and said conduit wall define a first region surrounding said first cavity.

7. A filter assembly according to claim 6, wherein fluid enters the filter assembly through said first region.

8. A filter assembly comprising:

a filter element including a filter wall having a plurality of perforations formed therein, said filter wall defining an inner region having an open end and a closed end;

an outer wall surrounding the filter wall, said outer wall and said filter wall defining a cavity surrounding said inner region;

a housing surrounding the outer wall, said housing and said outer wall defining an outer chamber fluidly connected to said open end of said inner region; and a plunger movable between a first position and a second position to remove solid debris from said inner region and said plurality of perforations.

9. A filter assembly according to claim 8, wherein said plunger includes:

a scraper element operable to remove solid debris from said inner region and said plurality of perforations, said scraper element fixed at a first end of the plunger extending into said inner region, and a stopper element operable to impede flow of solid debris out of said filter assembly, said stopper element fixed at a second end of the plunger distal from the first end of the plunger.

10. A filter assembly according to claim 9, wherein said stopper element impedes the flow of solid debris past the stopper element when said plunger is in said first position, and said stopper element does not impede the flow of solid debris past the stopper element when said plunger is in said second position.

11. A filter assembly according to claim 8, wherein said cavity is in fluid communication with a return conduit to a pre-washing chamber.

12. A filter assembly according to claim 8, wherein fluid enters the filter assembly through said outer chamber.

13. A filter assembly comprising:

a filter element including:

a perforated wall member defining a chamber having an open end and a closed end; and a plunger moveable between a first position and a second position, said plunger including:

a scraper element operable to remove solid debris from said chamber, said scraper element fixed at a first end of the plunger extending into said chamber, and a stopper element fixed at a second end of the plunger distal from the first end of the plunger, wherein said stopper element moves between a stopper position and a bypass position as said plunger moves between the first position and the second position, wherein the flow of solid debris past the stopper element is impeded in the stopper position and the flow of solid debris past the stopper element is not impeded in the bypass position.

14. A filter assembly according to claim 13, wherein said filter assembly further comprises:

a conduit wall, wherein said wall member and said conduit wall define a first cavity surrounding said chamber.

15. A filter assembly according to claim 14, wherein said first cavity is in fluid communication with a return conduit to a pre-washing chamber.

16. A filter assembly according to claim 14, wherein said filter assembly further comprises:

a housing, wherein said housing and said conduit wall define a first region surrounding said first cavity.

17. A filter assembly according to claim 16, wherein fluid enters the filter assembly through said first region.

18. A filter assembly comprising:

a filter element including a filter wall having a plurality of perforations formed therein, said filter wall defining an inner region having an open end and a closed end;

an outer wall surrounding the filter wall, said outer wall and said filter wall defining a cavity surrounding said inner region;

a housing surrounding the outer wall, said housing and said outer wall defining an outer chamber; and a plunger movable between a first position and a second position to remove solid debris from said inner region and said plurality of perforations, wherein said plunger includes:

a scraper element operable to remove solid debris from said inner region and said plurality of perforations, said scraper element fixed at a first end of the plunger extending into said inner region, and a stopper element operable to impede flow of solid debris out of said filter assembly, said stopper element fixed at a second end of the plunger distal from the first end of the plunger.

19. A filter assembly according to claim 18, wherein said stopper element impedes the flow of solid debris past the stopper element when said plunger is in said first position, and said stopper element does not impede the flow of solid debris past the stopper element when said plunger is in said second position.

20. A filter assembly according to claim 18, wherein said cavity is in fluid communication with a return conduit to a pre-washing chamber.

21. A filter assembly according to claim 18, wherein fluid enters the filter assembly through said outer chamber.

* * * * *